United States Patent
Hu et al.

(10) Patent No.: US 12,101,123 B2
(45) Date of Patent: Sep. 24, 2024

(54) DISTRIBUTED OPTICAL MILLIMETER WAVE TERAHERTZ TRANSFER SYSTEM AND TRANSFER METHOD

(71) Applicant: Shanghai Jiao Tong University, Shanghai (CN)

(72) Inventors: Liang Hu, Shanghai (CN); Qi Li, Shanghai (CN); Guiling Wu, Shanghai (CN); Jiao Liu, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 208 days.

(21) Appl. No.: 17/941,012

(22) Filed: Sep. 8, 2022

(65) Prior Publication Data
US 2023/0188216 A1    Jun. 15, 2023

Related U.S. Application Data

(63) Continuation of application No. PCT/CN2021/141501, filed on Dec. 27, 2021.

(30) Foreign Application Priority Data

Dec. 13, 2021  (CN) .......................... 202111522505.0
Dec. 13, 2021  (CN) .......................... 202111522543.6

(51) Int. Cl.
  *H04B 10/25*     (2013.01)
  *H04B 10/43*     (2013.01)

(52) U.S. Cl.
  CPC ....... *H04B 10/43* (2013.01); *H04B 10/25891* (2020.05)

(58) Field of Classification Search
  CPC ................................. H04B 10/00; G02B 6/00
  (Continued)

(56) References Cited

U.S. PATENT DOCUMENTS

5,365,239 A * 11/1994 Stilwell, Jr. .......... H01Q 3/2676
                                                                  342/368
7,450,618 B2 * 11/2008 Dantus ............... G01N 21/6402
                                                                  372/27
(Continued)

FOREIGN PATENT DOCUMENTS

CN        102215104 A       10/2011
CN        103684611 A        3/2014
(Continued)

OTHER PUBLICATIONS

Delmade, Amol, et al., "Optical Heterodyne Analog Radio-Over Fiber Link for Millimeter-Wave Wireless Systems," DOI 10.1109/JLT.2020.3032923, Journal of Lightwave Technology, pp. 1-10 (Dec. 21, 2020).
(Continued)

*Primary Examiner* — Kaveh C Kianni
(74) *Attorney, Agent, or Firm* — Mei & Mark LLP; Manni Li

(57) ABSTRACT

An optical millimeter wave terahertz transfer system and transfer method are disclosed. The device comprises a local terminal, a transfer link, an access terminal, and a user terminal. By using the device in the transfer link, optical signals transferred forward and backward are extracted through optical couplers, and millimeter wave terahertz signals with a stable phase are obtained at any position in the transfer link through optical signal filtering, photovoltaic conversion, microwave filtering, frequency division and optical frequency shift processing. The device and method have the characteristics of high reliability, simple structure, and low implementation cost.

5 Claims, 2 Drawing Sheets

(58) Field of Classification Search
USPC .......................................................... 385/31
See application file for complete search history.

(56) References Cited

U.S. PATENT DOCUMENTS

| | | | | |
|---|---|---|---|---|
| 7,567,596 | B2* | 7/2009 | Dantus | G01B 9/02091 |
| | | | | 372/27 |
| 7,609,731 | B2* | 10/2009 | Dantus | G01N 21/4795 |
| | | | | 372/9 |
| 7,733,497 | B2* | 6/2010 | Yun | G02F 1/11 |
| | | | | 356/497 |
| 7,903,909 | B2* | 3/2011 | Popovic | G02B 6/125 |
| | | | | 385/27 |
| 7,969,578 | B2* | 6/2011 | Yun | G01B 9/02091 |
| | | | | 356/485 |
| 7,973,936 | B2* | 7/2011 | Dantus | G01N 21/00 |
| | | | | 356/451 |
| 2005/0169582 | A1* | 8/2005 | Tan | G02F 1/0955 |
| | | | | 385/27 |
| 2006/0103380 | A1* | 5/2006 | Kochergin | G01R 33/0322 |
| | | | | 324/244.1 |
| 2006/0159135 | A1* | 7/2006 | Cliche | H01S 5/0687 |
| | | | | 372/38.08 |
| 2006/0214866 | A1* | 9/2006 | Araki | G04G 21/04 |
| | | | | 343/788 |
| 2006/0227331 | A1* | 10/2006 | Vollmer | G01N 21/7746 |
| | | | | 356/483 |
| 2008/0267557 | A1* | 10/2008 | Wang | G02B 6/12007 |
| | | | | 385/16 |
| 2009/0142019 | A1* | 6/2009 | Popovic | G02B 6/1223 |
| | | | | 385/28 |
| 2010/0238536 | A1* | 9/2010 | Hu | G02B 6/12007 |
| | | | | 385/32 |
| 2012/0002914 | A1* | 1/2012 | Kroemer | G02F 1/0955 |
| | | | | 385/27 |
| 2014/0175267 | A1* | 6/2014 | Thiel | H04B 10/11 |
| | | | | 359/326 |
| 2015/0261058 | A1* | 9/2015 | Silverstone | H04B 10/70 |
| | | | | 977/950 |
| 2017/0199402 | A1* | 7/2017 | Sun | G02F 1/0955 |
| 2017/0292875 | A1 | 10/2017 | Song et al. | |

FOREIGN PATENT DOCUMENTS

| | | |
|---|---|---|
| CN | 110061778 A | 7/2019 |
| CN | 111147150 A | 5/2020 |
| CN | 111181648 A | 5/2020 |
| CN | 112821956 A | 5/2021 |

OTHER PUBLICATIONS

Man, Xiaojing et al., "Phase Stabilized Distribution of Millimeter Wave Local Oscillator Based on Michelson Interferometer," Acta Optica Sinica, vol. 30, No. 8, pp. 2185-2188 (Aug. 31, 2010).

* cited by examiner

DISTRIBUTED OPTICAL MILLIMETER WAVE TERAHERTZ TRANSFER SYSTEM AND TRANSFER METHOD

CROSS-REFERENCE TO RELATED APPLICATIONS

The subject application is a continuation of PCT/CN2021/141501 filed on Dec. 27, 2021, which in turn claims priority to Chinese patent applications CN202111522505.0 and CN202111522543.6, both filed on Dec. 13, 2021 in China. The contents and subject matters of the PCT international stage application and Chinese priority applications are incorporated herein by reference.

BACKGROUND OF THE INVENTION

Technical Field

The present invention relates to optical fiber time and frequency transfer, in particular to a distributed optical millimeter wave/terahertz transfer system and transfer method.

Background Art

Long-distance transfer of high-stable frequency reference signals has been proven to play an important role in both radio astronomy and deep space networks. Application involving high-precision phase synchronization between antennas generally requires high-frequency reference signals with good synchronization and low delay jitter. Traditional satellite link based frequency transfer cannot meet the requirements of various high-precision application scenarios due to the effect of atmosphere turbulences and the like; whereas optical fiber and space link based optical frequency transfer technologies have been proven to be an effective solution for breaking through existing technical limitations for many times, in which optical fibers have the advantages of low attenuation, wide bandwidth, high reliability, electromagnetic interference resistance, etc. In recent years, many research groups propose many excellent transfer solutions aiming to optical millimeter wave transfer.

However, at present, optical millimeter wave frequency transfer aims to point-to-point application scenarios, and there is still no report on distributed transfer solution. In order to expand an application range of millimeter wave/terahertz signal transfer, for example, for meeting the application requirements of Atacama large millimeter array (ALMA) items, very long baseline interferometry (VLBI), etc., a distributed optical millimeter wave terahertz transfer solution is proposed.

SUMMARY OF THE INVENTION

An objective of the present invention is to provide a distributed optical millimeter wave terahertz transfer system and transfer method aiming to the deficiencies of the current technology and works. By employing the present invention, in a transfer link, optical signals transferred forward and backward are extracted through optical couplers, and millimeter wave terahertz signals with a stable phase are obtained at any position in the transfer link through optical signal filtering, photovoltaic conversion, microwave filtering, frequency division, and optical frequency shift processing.

Further, the technical solution further has the characteristics of high reliability, simple structure and low implementation cost.

The technical solution of the present invention is as follows:

The present invention provides an optical millimeter wave terahertz transfer system, comprising a local terminal (1), a transfer link (2), and a user terminal (3). The local terminal (1) comprises an optoisolator unit (10), a first optical coupler (11), a first Faraday rotator mirror (12), a second optical coupler (13), a first optical filter (14), a second optical filter (15), a first acousto-optic frequency shifter (16), a first microwave source (17), a second acousto-optic frequency shifter (18), a third optical coupler (19), a third optical filter (20), a fourth optical filter (21), a first photovoltaic conversion unit (22), a second photovoltaic conversion unit (23), a first electric filter (24), a second electric filter (25), a first mixer (26), a servo control unit (27), a voltage-controlled oscillator (28), and a fourth optical coupler (29);

the user terminal (3) comprises a third acousto-optic frequency shifter (30), a second microwave source (31), a fifth optical coupler (32), a second Faraday rotator mirror (33), a sixth optical coupler (34), a third microwave source (35), a first optical phase locking unit (36), a microwave power divider (37), a second optical phase locking unit (38), a seventh optical coupler (39), a third photovoltaic conversion unit (40), and a third electric filter (41);

a to-be-transferred optical millimeter wave signal $E_0$ is divided into two paths after passing through the optoisolator (10) and the first optical coupler (11), one path returns the first optical coupler (11) to be input into the third optical coupler (19) as local reference light signal $E_0$ after being reflected by the first Faraday rotator mirror (12); and other path is divided into two paths by the second optical coupler (13) again, and the two paths of signals $E_1$, $E_2$ are output by the first optical filter (14) and the first acousto-optic frequency shifter (16) as well as the second optical filter (15) and the second acousto-optic frequency shifter (18) respectively and are transferred by the transfer link (2) to arrive the user terminal (3) after being combined by the fourth optical coupler (29);

the $E_3$ signal is divided into two parts after passing through the third acousto-optic frequency shifter (30) and the fifth optical coupler (32) at the user terminal (3) in sequence, wherein one part is transferred by the transfer link (2) to the local terminal (1) after being reflected by the second Faraday rotator mirror (33) and then is split by the fourth optical coupler (29), the split signals return along original paths and are combined by the second optical coupler (13), the combined signal is input by a 3 port of the first optical coupler (11) and output by a 4 port of the first optical coupler (11), is input into the third optical coupler (19) with the local reference light together and is divided into two paths by the third optical coupler (19) again, one path enters the first mixer (26) after passing through the third optical filter (20), the first photovoltaic conversion unit (22) and the first electric filter (24) in sequence, the other path enters the first mixer (26) after passing through the fourth acousto-optic frequency shifter (21), the second photovoltaic conversion unit (23) and the second electric filter (25) in sequence, and after sidebands of the two paths of signals are taken down through frequency mixing of the first mixer (26), an output direct-current error signal enters the servo control unit (27) to drive the voltage-controlled oscillator (28) to achieve phase noise compensation;

the other part of the $E_3$ signal is divided into two paths after passing through the sixth optical coupler (34), one path passes through the first optical phase locking unit (36), and the other path passes through the second photovoltaic conversion unit (38); the third microwave source (35) outputs a radio frequency signal; the radio frequency signal is divided into two paths by the microwave power divider (37), and the two paths enter the first optical phase locking unit (36) and the second optical phase locking unit (38) respectively; and after the two beams of signals after optical phase locking enter the seventh optical coupler (39) to be combined, a stable millimeter wave signal can be obtained after the combined signal is filtered by the third photovoltaic conversion unit (40) and the third electric filter (41).

In the present invention, the transfer link is an optical fiber link or a free space link, and the free space link is composed of a free space optical transmitter module, a receiving module and free space links.

Further, the millimeter wave terahertz transfer method using the high-precision optical millimeter wave terahertz transfer system of the present invention may specifically comprise the following steps:

(1) a to-be-transferred optical millimeter wave signal of the local terminal is $E_0 \propto \cos(\omega_1 t+\varphi_1)+\cos(\omega_2 t+\varphi_2)$, wherein a difference between two angular frequencies and a difference between two phases are matched with a frequency and a phase of a millimeter wave respectively, that is $\omega_2-\omega_1=\omega_{mmW}$, and $\varphi_2-\varphi_1=\varphi_{mmW}$; the optical millimeter wave signal $E_0$ is divided into two parts after passing through an optoisolator and a first optical coupler: one part of the optical millimeter wave signal $E_0$ is reflected by a first Faraday rotator mirror and is input into a third optical coupler as local reference light after passing through the first optical coupler; and the other part of the optical millimeter wave signal $E_0$ is divided into two paths after passing through a second optical coupler: after one path passes through a first optical filter and a first acousto-optic frequency shifter, an output signal is denoted as $E_1$; after the other path passes through a second optical filter and a second acousto-optic frequency shifter, an output signal is denoted as $E_2$; and $E_1$ and $E_2$ signal expressions are as follows:

$$E_1 \propto \cos[(\omega_1+\omega_{RF1})t+\varphi_1+\varphi_{RF1}],$$

$$E_2 \propto \cos[(\omega_2+\omega_{vco})t+\varphi_2+\varphi_c],$$

In the formulas, $\omega_{RF1}$ and $\varphi_{RF1}$ are a frequency and an initial phase of radio frequency working of the first acousto-optic frequency shifter respectively, and $\omega_{vco}$ and $\omega_c$ are a frequency and an initial phase of radio frequency working of the second acousto-optic frequency shifter respectively.

(2) The $E_1$ and $E_2$ signals enter the transfer link after being combined by a fourth optical coupler, and after the combined signal passes through a third acousto-optic frequency shifter at a user terminal, wherein an expression of an output signal $E_3$ is as follows:

$$E_3 \propto \cos[(\omega_1+\omega_{RF1}+\omega_{RF2})t+\varphi_1+\varphi_{RF1}+\varphi_{RF2}+\varphi_{p1}]+$$
$$\cos[(\omega_2+\omega_{vco}+\omega_{RF2})t+\varphi_2+\varphi_c+\varphi_{RF2}+\varphi_{p2}].$$

In the formula, $\varphi_{p1}$ and $\varphi_{p2}$ represent phase noises introduced by the transfer link respectively, and $\omega_{RF2}$ and $\varphi_{RF2}$ represent a frequency and an initial phase of radio frequency working of the third acousto-optic frequency shifter respectively; and it should be noted that microwave sources used in the system do not have a phase synchronization relationship with the to-be-transferred optical millimeter wave signal. The $E_3$ signal is divided into two parts after passing through a fifth optical coupler: one part of the signal is reflected into the transfer link after passing through a second Faraday rotator mirror, is transferred to a fourth optical coupler, then passes through paths reciprocal with the $E_1$ and $E_2$ signals in sequence, passes through 3, 4 ports of the first optical coupler and is transferred to a 1 port of the third optical coupler, wherein an expression of the signal is as follows:

$$E_4 \propto \cos[(\omega_1+2\omega_{RF1}+2\omega_{RF2})t+\varphi_1+2\varphi_{RF1}+2\varphi_{RF2}+2\varphi_{p1}]+$$
$$\cos[(\omega_2+2\omega_{vco}+2\omega_{RF2})t+\varphi_2+2\varphi_c+2\varphi_{RF2}+2\varphi_{p2}].$$

(3) It assumes that link noises caused by transferring forward and backward are equal, and the $E_4$ signal and the local reference optical signal $E_0$ are divided into two paths after passing through the third optical coupler: after one path passes through a third optical filter, a first photovoltaic conversion unit and a first electric filter in sequence, an output signal is denoted as $E_5$; after the other path passes through a fourth optical filter, a second photovoltaic conversion unit and a second electric filter in sequence, an output signal is denoted as $E_6$, wherein expressions of $E_5$ and $E_6$ are as follows respectively:

$$E_5 \propto \cos[(2\omega_{RF1}+2\omega_{RF2})t+2\varphi_{RF1}+2\varphi_{RF2}+2\varphi_{p1}],$$

$$E_6 \propto \cos[(2\omega_{vco}+2\omega_{RF2})t+2\varphi_c+2\varphi_{RF2}+2\varphi_{p2}],$$

After sidebands of $E_5$ and $E_6$ signals are taken down through frequency mixing of a first mixer, an output direct-current error signal Ve enters a servo control unit, wherein an expression of the direct-current error signal is as follows:

$$Ve=2\varphi_c-2\varphi_{RF1}+2\varphi_{p2}-2\varphi_{p1}.$$

When the servo control unit works in a locked state Ve→0, the expression may be further written as follows:

$$\varphi_c=\varphi_{RF1}-\varphi_{p2}\varphi_{p1}.$$

(4) The other part of the $E_3$ signal is divided into two paths after passing through a sixth optical coupler: after one path passes through a first optical phase locking unit, an output signal is denoted as $E_7$; after the other path passes through a second optical phase locking unit, an output signal is denoted as $E_8$, wherein expressions of the $E_7$ and $E_8$ signals are as follows respectively:

$$E_7 \propto \cos[(\omega_1+\omega_{RF1}+\omega_{RF2}-\omega_{RF3})t+\varphi_1+\varphi_{RF1}+\varphi_{RF2}+\varphi_{p1}-\varphi_{RF3}],$$

$$E_8 \propto \cos[(\omega_2+\omega_{vco}+\omega_{RF2}-\omega_{RF3})t+\varphi_2+\varphi_c+\varphi_{RF2}+\varphi_{p2}-\varphi_{RF3}],$$

In the formulas, $\omega_{RF3}$ and $\omega_{RF3}$ represent an angular frequency and an initial phase of a radio frequency signal output by a third microwave source respectively, and after the $E_7$ and $E_8$ signals are combined by a seventh optical coupler, after the combined signal is filtered by the third photovoltaic conversion unit and a third electric filter, an expression of an output signal is as follows:

$$E_9 \propto \cos[(\omega_2-\omega_1)t+\varphi_2-\varphi_1+\varphi_c-\varphi_{RF1}+\varphi_{p2}-\varphi_{p1}].$$

The expression of $\varphi_c$ is substituted into the above formula, and the expression of $E_9$ may be further rewritten as follows:

$$E_9 \propto \cos[(\omega_2-\omega_1)t+\varphi_2-\varphi_1].$$

In another aspect, the present invention further provides a distributed optical millimeter wave terahertz transfer system which is characterized by comprising a local terminal, a transfer link, a user terminal and an access terminal.

The local terminal comprises an optoisolator unit, a first optical coupler, a first Faraday rotator mirror, a second optical coupler, a first optical filter, a second optical filter, a first acousto-optic frequency shifter, a first microwave source (17), a second acousto-optic frequency shifter (18), a third optical coupler, a third optical filter, a fourth optical filter (21), a first photovoltaic conversion unit (22), a second photovoltaic conversion unit (23), a first electric filter (24), a second electric filter (25), a first mixer (26), a servo control unit (27), a voltage-controlled oscillator (28) and a fourth optical coupler (29).

The user terminal (3) comprises a third acousto-optic frequency shifter (30), a second microwave source (31), a fifth optical coupler (32), a second Faraday rotator mirror (33), a sixth optical coupler (34), a third microwave source (35), a first optical phase locking unit (36), a microwave power divider (37), a second optical phase locking unit (38), a seventh optical coupler (39), a third photovoltaic conversion unit (40) and a third electric filter (41).

The to-be-transferred optical millimeter wave signal $E_0$ is divided into two paths after passing through the optoisolator (10) and the first optical coupler (11) in sequence, wherein after being reflected by the first Faraday rotator mirror (12), one path returns to the first optical coupler (11) and is input into the third optical coupler (19) as a local reference optical signal $E_O$; and the other path is divided into two paths by the second optical coupler (13) again, the two paths are output by the first optical filter (14) and the first acousto-optic frequency shifter (16) as well as the second optical filter (15) and the second acousto-optic frequency shifter (18) respectively, and the two paths of signals $E_1$ and $E_2$ are transferred by the transfer link (2) to arrive the user terminal (3) after being combined by the fourth optical coupler (29).

The signal $E_3$ is divided into two parts after passing through the third acousto-optic frequency shifter (30) and the fifth optical coupler (32) at the user terminal (3) in sequence, wherein one part is transferred to the local terminal (1) by the transfer link (2) after being reflected by the second Faraday rotator mirror (33) and is split by the fourth optical coupler (29); then the split signals return along original paths and are combined by the second optical coupler (13); then the combined signal is input by the 3 port and output by the 4 port of the first optical coupler (11), then is input into the third optical coupler (19) with the local reference light together and is divided into two paths by the third optical coupler (19) again; one path enters the first mixer (26) after passing through the third optical filter (20), the first photovoltaic conversion unit (22) and the first electric filter (24) in sequence, and the other path enters the first mixer (26) after passing through the fourth optical filter (21), the second photovoltaic conversion unit (23) and the second electric filter (25) in sequence; and after sidebands of the two paths of signals are taken down through frequency mixing of the first mixer (26), an output direct-current error signal enters the servo control unit (27), and the voltage-controlled oscillator (28) is driven to achieve phase noise compensation.

The other part of signal $E_3$ is divided into two paths after passing through the sixth optical coupler (34), the two paths enter the first optical phase locking unit (36) and the second optical phase locking unit (38) respectively, the third microwave source (35) outputs a radio frequency signal, the radio frequency signal is divided into two paths by the microwave power divider (37), and the two paths enter the first optical phase locking unit (36) and the second optical phase locking unit (38) respectively.

A signal mutually beating frequencies of two beams of light is converted to two beams of direct-current signals, the two beams of direct-current signals enter the seventh optical coupler (39) to be combined, and a stable millimeter wave signal may be obtained after the combined signal is filtered by the third photovoltaic conversion unit (40) and the third electric filter (41).

The access terminal comprises an eighth optical coupler, a ninth optical coupler, a tenth optical coupler, a fifth optical filter, a fourth photovoltaic conversion unit, a fourth electric filter, a first frequency divider unit, a sixth optical filter, a fifth photovoltaic conversion unit, a fifth electric filter, a second frequency divider unit, a seventh optical filter, a fourth acousto-optic frequency shifter, an eighth optical filter, a fifth acousto-optic frequency shifter, an eleventh optical coupler, a sixth photovoltaic conversion unit and a sixth electric filter.

The eighth optical coupler is located at any node of the transfer link and used for obtaining an optical signal transferred forward and an optical signal transferred backward. The optical signal transferred forward is divided into three paths by the ninth optical coupler, wherein the first path is combined with the optical signal transferred backward through the tenth optical coupler, then the combined signal is divided into two parts, one part is loaded on the fourth acousto-optic frequency shifter after passing through the fifth optical filter, the fourth photovoltaic conversion unit, the fourth electric filter and the first frequency divider unit in sequence, and the other part is loaded on the fifth acousto-optic frequency shifter after passing through the sixth optical filter, the fifth photovoltaic conversion unit, the fifth electric filter and the second frequency divider unit in sequence; the second path enters the eleventh optical coupler after passing through the seventh optical filter and the fourth acousto-optic frequency shifter in sequence; the third path enters the eleventh optical coupler after passing through the eighth optical filter and the fifth acousto-optic frequency shifter in sequence; and after the second path of signal and the third path of signal are combined by the eleventh optical coupler, the combined signal passes through the sixth photovoltaic conversion unit and the sixth electric filter, and then a stable millimeter wave signal is output.

The transfer link is an optical fiber link or a free space link, and the free space link is composed of a free space optical transmitter module, a receiving module and free space links.

Furthermore, the transfer method for the distributed optical millimeter wave terahertz transfer system of the present invention may be characterized by specifically comprising the following steps:

(1) a to-be-transferred optical millimeter wave signal of the local terminal is $E_0 \propto \cos(\omega_1 t+\varphi_1)+\cos(\omega_2 t+\varphi_2)$, wherein a difference between two angular frequencies and a difference between two phases are matched with a frequency and a phase of a millimeter wave respectively, that is $\omega_2-\omega_1=\omega_{mmW}$, and $\varphi_2-\varphi_1=\varphi_{mmW}$; the optical millimeter wave signal $E_0$ is divided into two paths after passing through an optoisolator and a first optical coupler: one path is reflected by a first Faraday rotator mirror and is input into a third optical coupler as local reference light after passing through the first optical coupler; and the other path is divided into two parts after passing through the second optical coupler, after one part of the optical signal $E_0$ passes through the first optical filter and the first acousto-optic frequency shifter, an output signal is denoted as $E_1$, and after the other part of the optical signal $E_0$ passes through the second optical filter and the second acousto-optic frequency shifter, an output signal is denoted as $E_2$; and $E_1$ and $E_2$ signal expressions are as follows:

$$E_1 \propto \cos[(\omega_1+\omega_{RF1})t+\varphi_1+\varphi_{RF1}],$$

$$E_2 \propto \cos[(\omega_2+\omega_{vco})t+\varphi_2+\varphi_c].$$

In the formulas, $\omega_{RF1}$ and $\varphi_{RF1}$ are a frequency and an initial phase of radio frequency working of the first acousto-optic frequency shifter respectively, and $\omega_{vco}$ and $\varphi_c$ are a frequency and an initial phase of radio frequency working of the second acousto-optic frequency shifter respectively.

(2) The $E_1$ and $E_2$ signals enter the transfer link after being combined by the fourth optical coupler, and after the combined signal passes through the third acousto-optic frequency shifter at the user terminal, an expression of an output signal $E_3$ is as follows:

$$E_3 \propto \cos[(\omega_1+\omega_{RF1}+\omega_{RF2})t+\varphi_1+\varphi_{RF1}+\varphi_{RF2}+\varphi_{p1}] +$$
$$\cos[(\omega_2+\omega_{vco}+\omega_{RF2})t+\varphi_2+\varphi_c+\varphi_{RF2}+\varphi_{p2}]$$

wherein in the formula, $\varphi_{p1}$ and $\varphi_{p2}$ represent phase noises introduced by the transfer link respectively, and $\omega_{RF2}$ and $\varphi_{RF2}$ represent a frequency and an initial phase of radio frequency working of the third acousto-optic frequency shifter respectively.

The $E_3$ signal is divided into two parts after passing through the fifth optical coupler: one part of the signal is reflected into the transfer link after passing through the second Faraday rotator mirror, is transferred to the fourth optical coupler of the local terminal, then passes through paths reciprocal with the $E_1$ and $E_2$ signals in sequence, passes through the 3, 4 ports of the first optical coupler and is transferred to a the 1 port of the third optical coupler, wherein an expression of the signal is as follows:

$$E_4 \propto \cos[(\omega_1+2\omega_{RF1}+2\omega_{RF2})t+\varphi_1+2\varphi_{RF1}+2\varphi_{RF2}+2\varphi_{p1}] +$$
$$\cos[(\omega_2+2\omega_{vco}+2\omega_{RF2})t+\varphi_2+2\varphi_c+2\varphi_{RF2}+2\varphi_{p2}].$$

(3) This assumes that link noises caused by transferring forward and backward are equal, the $E_4$ signal and the local reference optical signal $E_0$ are divided into two paths after being combined by the third optical coupler: after one path passes through the third optical filter, the first photovoltaic conversion unit and the first electric filter in sequence, an output signal is denoted as $E_5$; after the other path passes through the fourth optical filter, the second photovoltaic conversion unit and the second electric filter, an output signal is denoted as $E_6$, wherein expressions of $E_5$ and $E_6$ are as follows respectively:

$$E_5 \propto \cos[(2\omega_{RF1}+2\omega_{RF2})t+2\varphi_{RF1}+2\varphi_{RF2}+2\varphi_{p1}],$$

$$E_6 \propto \cos[(2\omega_{vco}+2\omega_{RF2})t+2\varphi_c+2\varphi_{RF2}+2\varphi_{p2}].$$

After sidebands of $E_5$ and $E_6$ signals are taken down through frequency mixing of the first mixer, an output direct-current error signal Ve enters the servo control unit, wherein an expression of the direct-current error signal is as follows:

$$Ve=2\varphi_c-2\varphi_{RF1}+2\varphi_{p2}-2\varphi_{p1}.$$

When the servo control unit works in a locked state Ve→0, the expression may be further written as follows:

$$\varphi_c=\varphi_{RF1}-\varphi_{p2}+\varphi_{p1}.$$

(4) At the user terminal, the other part of the $E_3$ signal is divided into two paths after passing through the sixth optical coupler: after one path passes through the first optical phase locking unit, an output signal is denoted as $E_7$; after the other path passes through the second optical phase locking unit, an output signal is denoted as $E_8$, wherein expressions of the $E_7$ and $E_8$ signals are as follows respectively:

$$E_7 \propto \cos[(\omega_1+\omega_{RF1}+\omega_{RF2}-\omega_{RF3})t+\varphi_1+\varphi_{RF1}+\varphi_{RF2}+\varphi_{p1}-\varphi_{RF3}],$$

$$E_8 \propto \cos[(\omega_2+\omega_{vco}+\omega_{RF2}-\omega_{RF3})t+\varphi_2+\varphi_c+\varphi_{RF2}+\varphi_{p2}-\varphi_{RF3}],$$

In the formulas, $\omega_{RF3}$ and $\varphi_{RF3}$ represent an angular frequency and an initial phase of a radio frequency signal output by the third microwave source respectively, and after the $E_7$ and $E_8$ signals are combined by the seventh optical coupler, after the combined signal is filtered by the third photovoltaic conversion unit and the third electric filter, an expression of an output signal is as follows:

$$E_9 \propto \cos[(\omega_2-\omega_1)t+\varphi_2-\varphi_1+\varphi_c-\varphi_{RF1}+\varphi_{p2}-\varphi_{p1}].$$

The expression of $\varphi_c$ is substituted into the above formula, and the expression of $E_9$ may be further rewritten as follows:

$$E_9 \propto \cos[(\omega_2-\omega_1)t+\varphi_2-\varphi_1].$$

(5) At any node of the transfer link, optical signals transferred forward and backward are obtained through the eighth optical coupler, and expressions of the optical signals are as follows:

$$E_{10} \propto$$
$$\cos[(\omega_1+\omega_{RF1})t+\varphi_1+\varphi_{RF1}+\varphi_{pa1}]+\cos[(\omega_2+\omega_{vco})t+\varphi_2+\varphi_c+\varphi_{pa2}],$$
$$E_{11} \propto \cos[(\omega_1+\omega_{RF1}+2\omega_{RF2})t+\varphi_1+\varphi_{RF1}+2\varphi_{RF2}+\varphi_{p1}+\varphi_{pb1}]+$$
$$\cos[(\omega_2+\omega_{vco}+2\omega_{RF2})t+\varphi_2+\varphi_c+2\varphi_{RF2}+\varphi_{p2}+\varphi_{pb2}].$$

In the formulas, $\varphi_{pa1}$ and $\varphi_{pa2}$ are phase noises, introduced by the transfer link, from the local terminal to the access terminal at $\omega_1$ and $\omega_2$ frequencies respectively, $\varphi_{pb1}$ and $\varphi_{pb2}$ are phase noises, introduced by the transfer link, from the user terminal to the access terminal at the $\omega_1$ and $\omega_2$ frequencies, respectively.

(6) The $E_{10}$ signal is divided into three paths after passing through the ninth optical coupler, wherein one path is divided into two parts after being combined with the $E_{11}$ signal through the tenth optical coupler, an output signal is denoted as $E_{12}$ after one part passes through the fifth optical filter, the fourth photovoltaic conversion unit, the fourth electric filter and the first frequency divider unit, an output signal is denoted as $E_{13}$ after the other part passes through the sixth optical filter, the fifth photovoltaic conversion unit, the fifth electric filter and the second frequency divider, the $E_{12}$ and $E_{13}$ signals are loaded on the fourth acousto-optic frequency shifter and the fifth acousto-optic frequency shifter respectively, and expressions of the $E_{12}$ and $E_{13}$ signals are as follows:

$$E_{12} \propto \cos\left(\omega_{RF2}t + \varphi_{RF2} + \frac{\varphi_{p1} + \varphi_{pb1} - \varphi_{pa1}}{2}\right),$$

$$E_{13} \propto \cos\left(\omega_{RF2}t + \varphi_{RF2} + \frac{\varphi_{p2} + \varphi_{pb2} - \varphi_{pa2}}{2}\right).$$

(7) The other two paths of the $E_{10}$ signal pass through the seventh optical filter and the fourth acousto-optic frequency shifter as well as the eighth optical filter and the fifth acousto-optic frequency shifter respectively, and after the two paths of signals are combined by the eleventh optical coupler, wherein an expression of the combined signal is as follows:

$$E_{14} \propto$$
$$\cos\left[(\omega_1 + \omega_{RF1} + \omega_{RF2})t + \varphi_1 + \varphi_{RF1} + \varphi_{pa1} + \varphi_{RF2} + \frac{\varphi_{p1} + \varphi_{pb1} - \varphi_{pa1}}{2}\right] +$$
$$\cos\left[(\omega_2 + \omega_{vco} + \omega_{RF2})t + \varphi_2 + \varphi_c + \varphi_{pa2} + \varphi_{RF2} + \frac{\varphi_{p2} + \varphi_{pb2} - \varphi_{pa2}}{2}\right].$$

In the formula, a phase noise introduced by the link has a following relationship: $\varphi_{pb1}+\varphi_{pa1}=\varphi_{p1}$, $\varphi_{pb2}+\varphi_{pa2}=\varphi_{p2}$, and the $E_{14}$ signal may be further rewritten as follows:

$$E_{14} \propto \cos[(\omega_1 + \omega_{RF1} + \omega_{RF2})t + \varphi_1 + \varphi_{RF1} + \varphi_{p1} + \varphi_{RF2}] +$$
$$\cos[(\omega_2 + \omega_{vco} + \omega_{RF2})t + \varphi_2 + \varphi_c + \varphi_{p2} + \varphi_{RF2}].$$

After a phase locked loop enters a locked state, the $E_{14}$ passes through the sixth photovoltaic conversion unit and the sixth electric filter, and an expression of an output signal is as follows:

$$E_9 \propto \cos[(\omega_2-\omega_1)t+\varphi_2-\varphi_1]$$

The user terminal and any access terminal may both obtain a stable millimeter wave terahertz signal.

The present invention has the following technical effects that:

(1) On the one hand, phase compensation for the transfer link may be achieved without synchronization of a local reference source and the millimeter wave signal, and backward scatter noises in the system are further be effectively inhibited at the same time; and further, the present invention further has the characteristics of an unlimited compensation range and high reliability.

(2) On the other hand, in the transfer link, the optical signals transferred forward and backward are extracted through the optical couplers, and millimeter wave terahertz signals with a stable phase are obtained at any position in the transfer link through optical signal filtering, photovoltaic conversion, microwave filtering, frequency division and optical frequency shift processing. Further, the technical solution further has the characteristics of high reliability, simple structure and low implementation cost.

DETAILED DESCRIPTION OF THE INVENTION

The present invention is further described in combination with embodiments and drawings below. The detailed description and the specific working process are provided for the implementation of the embodiments according to the technical solution of the present invention, but the scope of protection of the present invention is not limited in the following embodiments.

Figure 1:
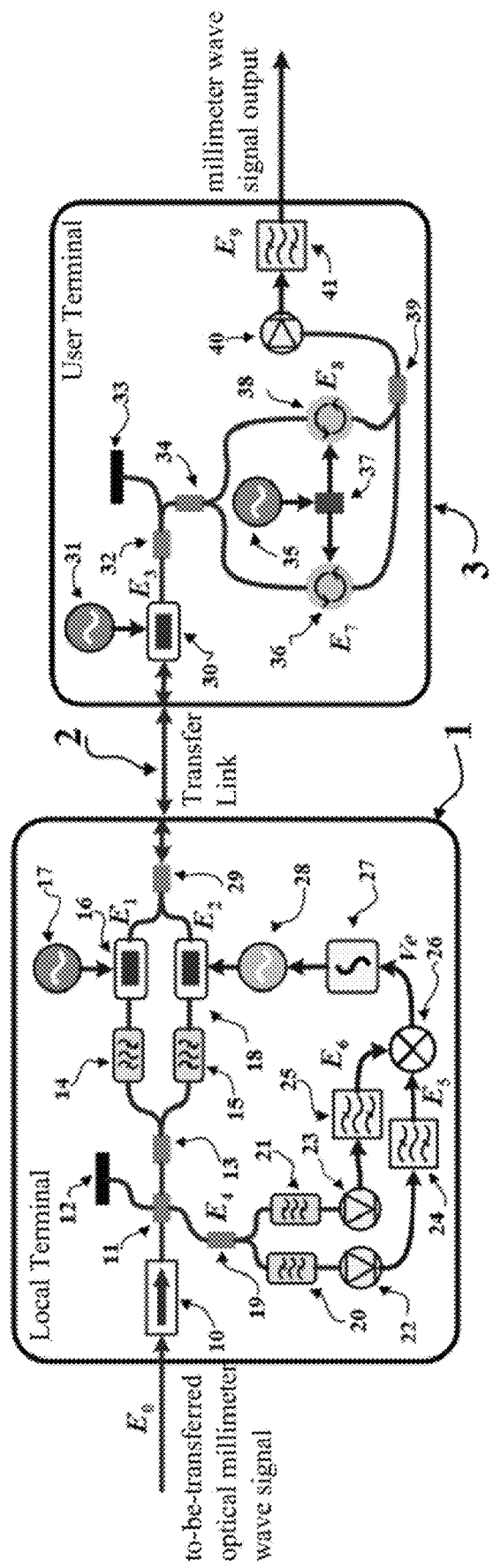
FIG. 1 is a structural schematic diagram of an embodiment of a high-precision optical millimeter wave terahertz transfer system of the present invention.

As shown in FIG. 1, the high-precision optical millimeter wave transfer system of the present invention comprises a local terminal 1, a transfer link 2, and a user terminal 3. The local terminal 1 comprises an optoisolator unit 10, a first optical coupler 11, a first Faraday rotator mirror 12, a second optical coupler 13, a first optical filter 14, a second optical filter 15, a first acousto-optic frequency shifter 16, a first microwave source 17, a second acousto-optic frequency shifter 18, a third optical coupler 19, a third optical filter 20, a fourth optical filter 21, a first photovoltaic conversion unit 22, a second photovoltaic conversion unit 23, a first electric filter 24, a second electric filter 25, a first mixer 26, a servo control unit 27, a voltage-controlled oscillator 28, and a fourth optical coupler 29. The user terminal 3 comprises a third acousto-optic frequency shifter 30, a second microwave source 31, a fifth optical coupler 32, a second Faraday rotator mirror 33, a sixth optical coupler 34, a third microwave source 35, a first optical phase locking unit 36, a microwave power divider 37, a second optical phase locking unit 38, a seventh optical coupler 39, a third photovoltaic conversion unit 40, and a third electric filter 41. A to-be-transferred optical millimeter wave signal $E_0$ is divided into two paths after passing through the optoisolator 10 and the first optical coupler 11, wherein one path returns the first optical coupler 11 to be input into the third optical coupler 19 as local reference light after being reflected by the first Faraday rotator mirror 12; and the other path is divided into two paths by the second optical coupler 13 again, and the two paths of signals are output by the first optical filter 14 and the first acousto-optic frequency shifter 16 as well as the second optical filter 15 and the second acousto-optic frequency shifter 18 respectively and are transferred by the transfer link 2 to arrive the user terminal 3 after being combined by the fourth optical coupler 29. A $E_3$ signal is divided into two parts after passing through the third acousto-optic frequency shifter 30 and the fifth optical coupler 32 at the user terminal 3 in sequence, wherein one part is transferred by the transfer link 2 to the local terminal 1 after being reflected by the second Faraday rotator mirror 33 and then is split by the fourth optical coupler 29, the split signals return along original paths and are combined by the second optical coupler 13, the combined signal is input by a 3 port of the first optical coupler 11 and output by a 4 port of the first optical coupler 11, is input into the third optical coupler 19 with the local reference light together and is divided into two paths by the third optical coupler 19 again, one path enters the first mixer 26 after passing through the third optical filter 20, the first photovoltaic conversion unit 22 and the first electric filter 24 in sequence, and the other path enters the first mixer 26 after passing through the fourth acousto-optic frequency shifter 21, the second photovoltaic conversion unit 23 and the second electric filter 25 in sequence; after sidebands of the two paths of signals are taken down through frequency mixing of the first mixer 26, an output direct-current error signal enters the servo control unit 27; and the other part of the $E_3$ signal is divided into two paths after passing through the sixth optical coupler 34; one path passes through the first optical phase locking unit 36, the other path passes through the second photovoltaic conversion unit 38, and the two paths of signals subjected to optical phase locking enter the seventh optical coupler 39 for combination and then filtered by the third photovoltaic conversion unit 40 and the third electric filter 41 separately to obtain a stable millimeter wave signal.

A high-precision optical millimeter wave terahertz transfer method of the present invention specifically comprises the following steps:

(1) a to-be-transferred optical millimeter wave signal of the local terminal is $E_0 \propto \cos(\omega_1 t+\varphi_1)+\cos(\omega_2 t+\varphi_2)$, wherein a difference between two angular frequencies and a difference between two phases are matched with a frequency and a phase of a millimeter wave respectively, that is $\omega_2-\omega_1=\omega_{mmW}$, and $\varphi_2-\varphi_1=\varphi_{mmW}$; the optical millimeter wave signal $E_0$ is divided into two parts after passing through the optoisolator 10 and the first optical coupler 11: one part of the optical millimeter wave signal $E_0$ is reflected by a first Faraday rotator mirror 12 and is input into a third optical coupler 19 as the local reference light after passing through the first optical coupler 11; and the other part of the optical millimeter wave signal $E_0$ is divided into two paths after passing through the second optical coupler 13: after one path passes through the first optical filter 14 and the first acousto-optic frequency shifter 16, an output signal is denoted as $E_1$; after the other path passes through the second optical filter 15 and the second acousto-optic frequency shifter 18, an output signal is denoted as $E_2$; and $E_1$ and $E_2$ signal expressions are as follows:

$E_1 \propto \cos[(\omega_1+\omega_{RF1})t+\varphi_1+\varphi_{RF1}]$, $E_2 \propto \cos[(\omega_2+\omega_{vco})t+\varphi_2+\varphi_c]$.

In the formulas, $\omega_{RF1}$ and $\varphi_{RF1}$ are a frequency and an initial phase of radio frequency working of the first acousto-optic frequency shifter 16, respectively, and $\omega_{vco}$ and $\varphi_c$ are a frequency and an initial phase of radio frequency working of the second acousto-optic frequency shifter 18, respectively.

(2) The $E_1$ and $E_2$ signals enter the transfer link 2 after being combined by the fourth optical coupler 29, and after the combined signal passes through the third acousto-optic frequency shifter 30 at the user terminal 3, an expression of an output frequency-shift signal $E_3$ is as follows:

$E_3 \propto \cos[(\omega_1 + \omega_{RF1} + \omega_{RF2})t + \varphi_1 + \varphi_{RF1} + \varphi_{RF2} + \varphi_{p1}] +$ $\cos[(\omega_2 + \omega_{vco} + \omega_{RF2})t + \varphi_2 + \varphi_c + \varphi_{RF2} + \varphi_{p2}]$.

In the formula, $\varphi_{p1}$ and $\varphi_{p2}$ represent phase noises introduced by the transfer link, respectively; and $\omega_{RF2}$ and $\varphi_{RF2}$ represent a frequency and an initial phase of radio frequency working of the third acousto-optic frequency shifter 30, respectively. The frequency-shift signal $E_3$ is divided into two parts after passing through the fifth optical coupler 32: one part is reflected into the transfer link 2 after passing through the second Faraday rotator mirror 33, is transferred to the fourth optical coupler 29, then passes through paths reciprocal with the $E_1$ and $E_2$ signals in sequence, passes through the 3, 4 ports of the first optical coupler 11 and is transferred to the 1 port of the third optical coupler 19, wherein an expression of the signal is as follows:

$E_4 \propto \cos[(\omega_1 + 2\omega_{RF1} + 2\omega_{RF2})t + \varphi_1 + 2\varphi_{RF1} + 2\varphi_{RF2} + 2\varphi_{p1}] +$ $\cos[(\omega_2 + 2\omega_{vco} + 2\omega_{RF2})t + \varphi_2 + 2\varphi_c + 2\varphi_{RF2} + 2\varphi_{p2}]$.

(3) It assumes that link noises caused by transferring forward and backward are equal, and the signal $E_4$ and the local reference optical signal $E_0$ are divided into two paths after passing through the third optical coupler 19: after one path passes through the third optical filter 20, the first photovoltaic conversion unit 22 and the first electric filter 24 in sequence, an output signal is denoted as $E_5$; after the other path passes through the fourth optical filter 21, the second photovoltaic conversion unit 23 and the second electric filter 25, an output signal is denoted as $E_6$, wherein expressions of $E_5$ and $E_6$ are as follows, respectively:

$E_5 \propto \cos[(2\omega_{RF1}+2\omega_{RF2})t+2\varphi_{RF1}+2\varphi_{RF2}+2\varphi_{p1}]$, $E_6 \propto \cos[(2\omega_{vco}+2\omega_{RF2})t+2\varphi_c+2\varphi_{RF2}+2\varphi_{p2}]$.

After sidebands of $E_5$ and $E_6$ signals are taken down through frequency mixing of the first mixer 26, an output direct-current error signal Ve enters the servo control unit 27, wherein an expression of the direct-current error signal is as follows:

$Ve=2\varphi_c-2\varphi_{RF1}+2\varphi_{p2}-2\varphi_{p1}$.

Based on the loop control theory, the servo control unit 27 achieves precompensation for link phase noises by changing a frequency of the voltage-controlled oscillator 28 in real time; and when the servo control unit 27 works in a locked state, that is an error signal is 0, Ve→0, an expression may be further written as follows:

$\varphi_c=\varphi_{RF1}-\varphi_{p2}\varphi_{p1}$.

(4) The other part of the signal $E_3$ is divided into two paths after passing through the sixth optical coupler 34: after one path passes through the first optical phase locking unit 36, an output signal is denoted as $E_7$; and after the other path passes through the second optical phase locking unit 38, an output signal is denoted as $E_8$, wherein expressions of the $E_7$ and $E_8$ signals are as follows respectively:

$E_7 \propto \cos[(\omega_1+\omega_{RF1}+\omega_{RF2}-\omega_{RF3})t+\varphi_1+\varphi_{RF1}+\varphi_{RF2}+\varphi_{p1}-\varphi_{RF3}]$, $E_8 \propto \cos[(\omega_2+\omega_{vco}+\omega_{RF2}-\omega_{RF3})t+\varphi_2+\varphi_c+\varphi_{RF2}+\varphi_{p2}-\varphi_{RF3}]$, In the formulas, $\omega_{RF3}$ and $\varphi_{RF3}$ represent an angular frequency and an initial phase of a radio frequency signal output by the third microwave source 35 respectively, and after the $E_7$ and $E_8$ signals are combined by the seventh optical coupler 39, after the combined signal is filtered by the third photovoltaic conversion unit 40 and a third electric filter 41, an expression of an output signal is as follows:

$E_9 \propto \cos[(\omega_2-\omega_1)t+\varphi_2-\varphi_1+\varphi_c-\varphi_{RF1}+\varphi_{p2}-\varphi_{p1}]$.

The expression of $\varphi_c$ is substituted into the above formula, the expression of $E_9$ may be further rewritten as follows:

$E_9 \propto \cos[(\omega_2-\omega_1)t+\varphi_2-\varphi_1]$.

In the present invention, the phase noises of the transfer link are converted to two intermediate frequency signals for processing in a double heterodyne detection mode, the intermediate frequency signals are input into a single-carrier phase compensation module for completing locking, and then stable millimeter wave signal transfer may be achieved. The present invention may achieve phase compensation for the transfer link without synchronization of a local reference source and the millimeter wave signal and may further effectively inhibit backward scatter noises in the system at the same time. Further, the present invention further has the characteristics of an unlimited compensation range and high reliability.

Figure 2:
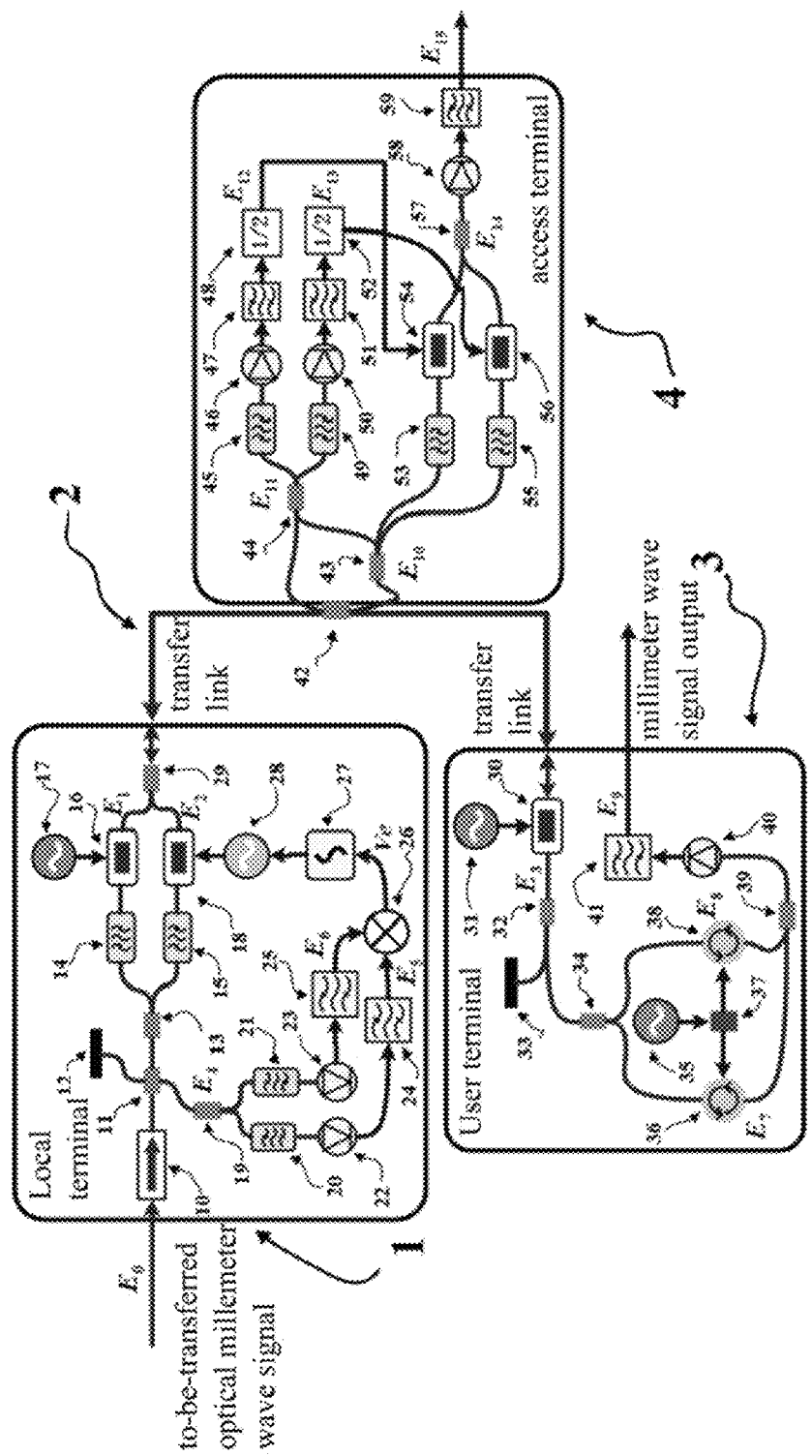
FIG. 2 is a structural schematic diagram of an embodiment of a distributed optical millimeter wave terahertz transfer system of the present invention.

As shown in FIG. 2, the high-precision optical millimeter wave transfer system of the present invention comprises a local terminal 1, a transfer link 2, a user terminal 3, and an access terminal 4. The local terminal 1 comprises an optoisolator unit 10, a first optical coupler 11, a first Faraday rotator mirror 12, a second optical coupler 13, a first optical filter 14, a second optical filter 15, a first acousto-optic frequency shifter 16, a first microwave source 17, a second acousto-optic frequency shifter 18, a third optical coupler 19, a third optical filter 20, a fourth optical filter 21, a first photovoltaic conversion unit 22, a second photovoltaic conversion unit 23, a first electric filter (24), a second electric filter 25, a first mixer 26, a servo control unit 27, a voltage-controlled oscillator (28), and a fourth optical coupler 29.

The user terminal 3 comprises a third acousto-optic frequency shifter 30, a second microwave source 31, a fifth optical coupler 32, a second Faraday rotator mirror 33, a sixth optical coupler 34, a third microwave source 35, a first optical phase locking unit 36, a microwave power divider 37, a second optical phase locking unit 38, a seventh optical coupler 39, a third photovoltaic conversion unit 40, and a third electric filter 41.

The to-be-transferred optical millimeter wave signal $E_0$ is divided into two paths after passing through the optoisolator 10 and the first optical coupler 11 in sequence, wherein after being reflected by the first Faraday rotator mirror 12, one path returns to the first optical coupler 11 and is input into the third optical coupler 19 as a local reference optical signal $E_0$; and the other path is divided into two paths by the second optical coupler 13 again, the two paths are output by the first optical filter 14 and the first acousto-optic frequency shifter 16 as well as the second optical filter 15 and the second acousto-optic frequency shifter 18, respectively, and the two paths of signals $E_1$ and $E_2$ are transferred by the transfer link 2 to arrive the user terminal 3 after being combined by the fourth optical coupler 29.

The signal $E_3$ is divided into two parts after passing through the third acousto-optic frequency shifter 30 and the fifth optical coupler 32 at the user terminal 3 in sequence, wherein one part is transferred to the local terminal 1 by the transfer link 2 after being reflected by the second Faraday rotator mirror 33 and is split by the fourth optical coupler 29; then, the split signals return along original paths and are combined by the second optical coupler 13; then, the combined signal is input by the 3 port and output by the 4 port of the first optical coupler (11), then, is input into the third optical coupler (19) with the local reference light together and is divided into two paths by the third optical coupler (19) again; one path enters the first mixer 26 after passing through the third optical filter 20, the first photovoltaic conversion unit (22) and the first electric filter 24 in sequence, and the other path enters the first mixer 26 after passing through the fourth optical filter 21, the second photovoltaic conversion unit 23 and the second electric filter 25 in sequence; and after sidebands of the two paths of signals are taken down through frequency mixing of the first mixer 26, an output direct-current error signal enters the servo control unit 27, and the voltage-controlled oscillator 28 is driven to achieve phase noise compensation.

The other part of signal $E_3$ is divided into two paths after passing through the sixth optical coupler 34, the two paths enter the first optical phase locking unit 36 and the second optical phase locking unit 38, respectively, the third microwave source 35 outputs a radio frequency signal, the radio frequency signal is divided into two paths by the microwave power divider 37, and the two paths enter the first optical phase locking unit 36 and the second optical phase locking unit 38, respectively.

A signal mutually beating frequencies of two beams of light is converted to two beams of direct-current signals, the two beams of direct-current signals enter the seventh optical coupler 39 to be combined, and a stable millimeter wave signal may be obtained after the combined signal is filtered by the third photovoltaic conversion unit 40 and the third electric filter 41.

The access terminal 4 comprises an eighth optical coupler 42, a ninth optical coupler 43, a tenth optical coupler 44, a fifth optical filter 45, a fourth photovoltaic conversion unit 46, a fourth electric filter 47, a first frequency divider unit 48, a sixth optical filter 49, a fifth photovoltaic conversion unit 50, a fifth electric filter 51, a second frequency divider unit 52, a seventh optical filter 53, a fourth acousto-optic frequency shifter 54, an eighth optical filter 55, a fifth acousto-optic frequency shifter 56, an eleventh optical coupler 57, a sixth photovoltaic conversion unit 58, and a sixth electric filter 59.

The eighth optical coupler 42 is located at any node of the transfer link 2 and used for obtaining an optical signal transferred forward and an optical signal transferred backward. The optical signal transferred forward is divided into three paths by the ninth optical coupler 43, wherein the first path is combined with the optical signal transferred backward through the tenth optical coupler 44, the combined signal is divided into two parts, one part is loaded on the fourth acousto-optic frequency shifter 51 after passing through the fifth optical filter 45, the fourth photovoltaic conversion unit 46, the fourth electric filter 47 and the first frequency divider unit 48 in sequence, and the other part is loaded on the fifth acousto-optic frequency shifter 56 after passing through the sixth optical filter 49, the fifth photovoltaic conversion unit 50, the fifth electric filter 51 and the second frequency divider unit 52 in sequence; the second path enters the eleventh optical coupler 57 after passing through the seventh optical filter 53 and the fourth acousto-optic frequency shifter 54 in sequence; the third path enters the eleventh optical coupler 57 after passing through the eighth optical filter 55 and the fifth acousto-optic frequency shifter 56 in sequence; and after the second path of signal and the third path of signal are combined by the eleventh optical coupler 57, the combined signal passes through the sixth photovoltaic conversion unit 58 and the sixth electric filter 59, and then a stable millimeter wave signal is output.

In the embodiment, the transfer link 2 is formed by optical fiber links, the local terminal 1 is located at one end of the transfer link 2, the access terminal is located at any position of the transfer link, and the user terminal 4 is located at the other end of the transfer link 2.

A millimeter wave terahertz transfer method using the distributed optical millimeter wave terahertz transfer system in the present invention is characterized by specifically comprising the following steps:

(1) a to-be-transferred optical millimeter wave signal of the local terminal is $E_0 \infty \cos(\omega_1 t + \varphi_1) + \cos(\omega_2 t + \varphi_2)$, wherein a difference between two angular frequencies and a difference between two phases are matched with a frequency and a phase of a millimeter wave respectively, that is $\omega_2 - \omega_1 = \omega_{mmW}$ and $\varphi_2 - \varphi_1 = \varphi_{mmW}$; the optical millimeter wave signal $E_0$ is divided into two paths after passing through the optoisolator 10 and the first optical coupler 11: one path is reflected by the first Faraday rotator mirror 12 and is input into the third optical coupler 19 as the local reference light after passing through the first optical coupler 11; and the other path is divided into two parts after passing through the second optical coupler 13, after one part of the $E_0$ optical signal passes through the first optical filter 14 and the first acousto-optic frequency shifter 16, an output signal is denoted as $E_1$, and after the other part of the $E_0$ optical signal passes through the second optical filter 15 and the second acousto-optic frequency shifter 18, an output signal is denoted as $E_2$; and $E_1$ and $E_2$ signal expressions are as follows:

$$E_1 \infty \cos[(\omega_1 + \omega_{RF1})t + \varphi_1 + \varphi_{RF1}],$$

$$E_2 \infty \cos[(\omega_2 + \omega_{vco})t + \varphi_2 + \varphi_c].$$

In the formulas, $\omega_{RF1}$ and $\varphi_{RF1}$ are a frequency and an initial phase of radio frequency working of the first acousto-optic frequency shifter 16 respectively, and $\omega_{vco}$ and $\varphi_c$ are a frequency and an initial phase of radio frequency working of the second acousto-optic frequency shifter 18, respectively.

(2) The $E_1$ and $E_2$ signals enter the transfer link 2 after being combined by the fourth optical coupler 29, and after the combined signal passes through the third acousto-optic frequency shifter 30 at the user terminal 3, an expression of an output signal $E_3$ is as follows:

$$E_3 \propto \cos[(\omega_1 + \omega_{RF1} + \omega_{RF2})t + \varphi_1 + \varphi_{RF1} + \varphi_{RF2} + \varphi_{p1}] + \cos[(\omega_2 + \omega_{vco} + \omega_{RF2})t + \varphi_2 + \varphi_c + \varphi_{RF2} + \varphi_{p2}],$$

wherein in the formula, $\varphi_{p1}$ and $\varphi_{p2}$ represent phase noises introduced by the transfer link respectively, and $\omega_{RF2}$ and $\varphi_{RF2}$ represent a frequency and an initial phase of radio frequency working of the third acousto-optic frequency shifter 30 respectively.

The $E_3$ signal is divided into two parts after passing through the fifth optical coupler 32: one part of the signal is reflected into the transfer link 2 after passing through the second Faraday rotator mirror 33, is transferred to the fourth optical coupler 29 of the local terminal, then passes through paths reciprocal with the $E_1$ and $E_2$ signals in sequence, passes through the 3, 4 ports of the first optical coupler 11 and is transferred to a the 1 port of the third optical coupler 19, wherein an expression of the signal is as follows:

$$E_4 \propto \cos[(\omega_1 + 2\omega_{RF1} + 2\omega_{RF2})t + \varphi_1 + 2\varphi_{RF1} + 2\varphi_{RF2} + 2\varphi_{p1}] + \cos[(\omega_2 + 2\omega_{vco} + 2\omega_{RF2})t + \varphi_2 + 2\varphi_c + 2\varphi_{RF2} + 2\varphi_{p2}].$$

(3) This assumes that link noises transferred forward and backward are equal, and the $E_4$ signal and the local reference optical signal $E_0$ are divided into two paths after being combined by the third optical coupler 19: after one path passes through the third optical filter 20, the first photovoltaic conversion unit 22 and the first electric filter 24 in sequence, an output signal is denoted as $E_5$; and after the other path passes through the fourth optical filter 21, the second photovoltaic conversion unit 23 and the second electric filter 25, an output signal is denoted as $E_6$, wherein expressions of $E_5$ and $E_6$ are as follows respectively:

$$E_5 \infty \cos[(2\omega_{RF1} + 2\omega_{RF2})t + 2\varphi_{RF1} + 2\varphi_{RF2} + 2\varphi_{p1}],$$

$$E_6 \infty \cos[(2\omega_{vco} + 2\omega_{RF2})t + 2\varphi_c + 2\varphi_{RF2} + 2\varphi_{p2}].$$

After sidebands of $E_5$ and $E_6$ signals are taken down through frequency mixing of the first mixer 26, an output direct-current error signal Ve enters the servo control unit 27, wherein an expression of the direct-current error signal is as follows:

$$Ve = 2\varphi_c - 2\varphi_{RF1} + 2\varphi_{p2} - 2\varphi_{p1}.$$

When the servo control unit 27 works in a locked state $Ve \rightarrow 0$, the expression may be further written as follows:

$$\varphi_c = \varphi_{RF1} - \varphi_{p2} \varphi_{p1}.$$

(4) At the user terminal 3, the other part of the $E_3$ signal is divided into two paths after passing through the sixth optical coupler 34: after one path passes through the first optical phase locking unit 36, an output signal is denoted as $E_7$; and after the other path passes through a second optical phase locking unit 38, an output signal is denoted as $E_8$, wherein expressions of the $E_7$ and $E_8$ signals are as follows respectively:

$$E_7 \infty \cos[(\omega_1 + \omega_{RF1} + \omega_{RF2} - \omega_{RF3})t + \varphi_1 + \varphi_{RF1} + \varphi_{RF2} + \varphi_{p1} - \varphi_{RF3}],$$

$$E_8 \infty \cos[(\omega_2 + \omega_{vco} + \omega_{RF2} - \omega_{RF3})t + \varphi_2 + \varphi_c + \varphi_{RF2} + \varphi_{p2} - \varphi_{RF3}],$$

In the formulas, $\omega_{RF3}$ and $\varphi_{RF3}$ represent an angular frequency and an initial phase of a radio frequency signal output by the third microwave source 35 respectively, and after the $E_7$ and $E_8$ signals are combined by the seventh optical coupler 39, after the combined signal is filtered by the third photovoltaic conversion unit 40 and the third electric filter 41, an expression of an output signal is as follows:

$$E_9 \infty \cos[(\omega_2 - \omega_1)t + \varphi_2 - \varphi_1 + \varphi_c - \varphi_{RF1} + \varphi_{p2} - \varphi_{p1}].$$

The expression of $\varphi_c$ is substituted into the above formula, the expression of $E_9$ may be further rewritten as follows:

$$E_9 \infty \cos[(\omega_2 - \omega_1)t + \varphi_2 - \varphi_1].$$

(5) At any node of the transfer link 2, optical signals transferred forward and backward are obtained through the eighth optical coupler 42, and expressions of the optical signals are as follows:

$$E_{10} \propto \cos[(\omega_1 + \omega_{RF1})t + \varphi_1 + \varphi_{RF1} + \varphi_{pa1}] + \cos[(\omega_2 + \omega_{vco})t + \varphi_2 + \varphi_c + \varphi_{pa2}],$$

$$E_{11} \propto \cos[(\omega_1 + \omega_{RF1} + 2\omega_{RF2})t + \varphi_1 + \varphi_{RF1} + 2\varphi_{RF2} + \varphi_{p1} + \varphi_{pb1}] + \cos[(\omega_2 + \omega_{vco} + 2\omega_{RF2})t + \varphi_2 + \varphi_c + 2\varphi_{RF2} + \varphi_{p2} + \varphi_{pb2}].$$

In the formulas, $\varphi_{pa1}$ and $\varphi_{pa2}$ are phase noises, introduced by the transfer link, from the local terminal 1 to the access terminal 4 at $\omega_1$ and $\omega_2$ frequencies respectively, and $\varphi_{pb1}$ and $\varphi_{pb2}$ are phase noises, introduced by the transfer link, from the user terminal 3 to the access terminal 4 at the $\omega_1$ and $\omega_2$ frequencies respectively.

(6) The $E_{10}$ signal is divided into three paths after passing through the ninth optical coupler 43, wherein one path is divided into two parts after being combined with the $E_{11}$ signal through the tenth optical coupler 44, an output signal is denoted as $E_{12}$ after one part passes through the fifth optical filter 45, the fourth photovoltaic conversion unit 46, the fourth electric filter 47 and the first frequency divider unit 48, an output signal is denoted as $E_{13}$ after the other part passes through the sixth optical filter 49, the fifth photovoltaic conversion unit 50, the fifth electric filter 51 and the second frequency divider 52, the $E_{12}$ and $E_{13}$ signals are loaded on the fourth acousto-optic frequency shifter 54 and the fifth acousto-optic frequency shifter 56, respectively, and expressions of the $E_{12}$ and $E_{13}$ signals are as follows:

$$E_{12} \propto \cos\left(\omega_{RF2}t + \varphi_{RF2} + \frac{\varphi_{p1} + \varphi_{pb1} - \varphi_{pa1}}{2}\right),$$
$$E_{13} \propto \cos\left(\omega_{RF2}t + \varphi_{RF2} + \frac{\varphi_{p2} + \varphi_{pb2} - \varphi_{pa2}}{2}\right).$$

(7) The other two paths of the $E_{10}$ signal pass through the seventh optical filter 53 and the fourth acousto-optic frequency shifter 54 as well as the eighth optical filter 55 and the fifth acousto-optic frequency shifter 56 respectively, and after the two paths of signals are combined by the eleventh optical coupler 57, an expression of the combined signal is as follows:

$$E_{14} \propto$$
$$\cos\left[(\omega_1 + \omega_{RF1} + \omega_{RF2})t + \varphi_1 + \varphi_{RF1} + \varphi_{pa1} + \varphi_{RF2} + \frac{\varphi_{p1} + \varphi_{pb1} - \varphi_{pa1}}{2}\right] +$$
$$\cos\left[(\omega_2 + \omega_{vco} + \omega_{RF2})t + \varphi_2 + \varphi_c + \varphi_{pa2} + \varphi_{RF2} + \frac{\varphi_{p2} + \varphi_{pb2} - \varphi_{pa2}}{2}\right].$$

In the formula, a phase noise introduced by the link has a following relationship: $\varphi_{pb1}+\varphi_{pa1}=\varphi_{p1}$, $\varphi_{pb2}+\varphi_{pa2}=\varphi_{p2}$, and the $E_{14}$ signal may be further rewritten as follows:

$$E_{14} \propto \cos[(\omega_1 + \omega_{RF1} + \omega_{RF2})t + \varphi_1 + \varphi_{RF1} + \varphi_{p1} + \varphi_{RF2}] +$$
$$\cos[(\omega_2 + \omega_{vco} + \omega_{RF2})t + \varphi_2 + \varphi_c + \varphi_{p2} + \varphi_{RF2}].$$

After a phase locked loop enters a locked state, the $E_{14}$ passes through the sixth photovoltaic conversion unit 58 and the sixth electric filter 59, and an expression of an output signal is as follows:

$$E_{15} \propto \cos[(\omega_2-\omega_1)t+\varphi_2-\varphi_1]$$

The user terminal and any access terminal may both obtain a stable millimeter wave terahertz signal.

Experiments show that by employing the present invention, in the transfer link, the optical signals transferred forward and backward are extracted through the optical couplers, and the millimeter wave terahertz signals with a stable phase are obtained at any position in the transfer link through optical signal filtering, photovoltaic conversion, microwave filtering, frequency division, and optical frequency shift processing. Further, the technical solution further has the characteristics of high reliability, simple structure and low implementation cost.

We claim:

1. An optical millimeter wave terahertz transfer system, comprising a local terminal, a transfer link, and a user terminal, wherein the local terminal comprises an optoisolator unit, a first optical coupler, a first Faraday rotator mirror, a second optical coupler, a first optical filter, a second optical filter, a first acousto-optic frequency shifter, a first microwave source, a second acousto-optic frequency shifter, a third optical coupler, a third optical filter, a fourth optical filter, a first photovoltaic conversion unit, a second photovoltaic conversion unit, a first electric filter, a second electric filter, a first mixer, a servo control unit, a voltage-controlled oscillator, and a fourth optical coupler; the user terminal comprises a third acousto-optic frequency shifter, a second microwave source, a fifth optical coupler, a second Faraday rotator mirror, a sixth optical coupler, a third microwave source, a first optical phase locking unit, a microwave power divider, a second optical phase locking unit, a seventh optical coupler, a third photovoltaic conversion unit, and a third electric filter; a to-be-transferred optical millimeter wave signal $E_0$ is divided into two paths after passing through the optoisolator and the first optical coupler, one path returns the first optical coupler to be input into the third optical coupler as local reference light signal $E_0$ after being reflected by the first Faraday rotator mirror; and other path is divided into two paths by the second optical coupler again, and the two paths of signals $E_1$, $E_2$ are output by the first optical filter and the first acousto-optic frequency shifter as well as the second optical filter and the second acousto-optic frequency shifter respectively and are transferred by the transfer link to arrive the user terminal after being combined by the fourth optical coupler; the $E_3$ signal is divided into two parts after passing through the third acousto-optic frequency shifter and the fifth optical coupler at the user terminal in sequence, wherein one part is transferred by the transfer link to the local terminal after being reflected by the second Faraday rotator mirror and then is split by the fourth optical coupler, the split signals return along original paths and are combined by the second optical coupler, the combined signal is input by a 3 port of the first optical coupler and output by a 4 port of the first optical coupler, is input into the third optical coupler with the local reference light together and is divided into two paths by the third optical coupler again, one path enters the first mixer after passing through the third optical filter, the first photovoltaic conversion unit and the first electric filter in sequence, the other path enters the first mixer after passing through the fourth acousto-optic frequency shifter, the second photovoltaic conversion unit and the second electric filter in sequence, and after sidebands of the two paths of signals are taken down through frequency mixing of the first mixer, an output direct-current error signal enters the servo control unit to drive the voltage-controlled oscillator to achieve phase noise compensation; the other part of the $E_3$ signal is divided into two paths after passing through the sixth optical coupler, one path passes through the first optical phase locking unit, and the other path passes through the second photovoltaic conversion unit; the third microwave source outputs a radio frequency signal; the radio frequency signal is divided into two paths by the microwave power divider, and the two paths enter the first optical phase locking unit and the second optical phase locking unit respectively; and after the two beams of signals after optical phase locking enter the seventh optical coupler to be combined, a stable millimeter wave signal can be obtained after the combined signal is filtered by the third photovoltaic conversion unit and the third electric filter.

2. The optical millimeter wave terahertz transfer system according to claim 1, further comprising an access terminal, wherein the access terminal comprises an eighth optical coupler, a ninth optical coupler, a tenth optical coupler, a fifth optical filter, a fourth photovoltaic conversion unit, a fourth electric filter, a first frequency divider unit, a sixth optical filter, a fifth photovoltaic conversion unit, a fifth electric filter, a second frequency divider unit, a seventh optical filter, a fourth acousto-optic frequency shifter, an eighth optical filter, a fifth acousto-optic frequency shifter, an eleventh optical coupler, a sixth photovoltaic conversion unit, and a sixth electric filter; the eighth optical coupler is located at any node of the transfer link and used for obtaining an optical signal transferred forward and an optical signal transferred backward; the optical signal transferred forward is divided into three paths by the ninth optical coupler; the first path is combined with the optical signal transferred backward through the tenth optical coupler, the combined signal is divided into two parts, one part is loaded on the fourth acousto-optic frequency shifter after passing through the fifth optical filter, the fourth photovoltaic conversion unit, the fourth electric filter and the first frequency divider unit in sequence, and the other part is loaded on the fifth acousto-optic frequency shifter after passing through the sixth optical filter, the fifth photovoltaic conversion unit, the fifth electric filter and the second frequency divider unit in sequence; the second path enters the eleventh optical coupler after passing through the seventh optical filter and the fourth acousto-optic frequency shifter in sequence; the third path enters the eleventh optical coupler after passing through the eighth optical filter and the fifth acousto-optic frequency shifter in sequence; and after the second path of signal and the third path of signal are combined by the eleventh optical coupler, the combined signal passes through the sixth photovoltaic conversion unit and the sixth electric filter, and then a stable millimeter wave signal is output.

3. The millimeter wave terahertz transfer method using the optical millimeter wave terahertz transfer system of claim 2, comprising: (i) a to-be-transferred optical millimeter wave signal of the local terminal is $E_0 \propto \cos(\omega_1 t + \varphi_1) + \cos(\omega_2 t + \varphi_2)$, wherein a difference between two angular frequencies and a difference between two phases are matched with a frequency and a phase of a millimeter wave respectively, that is $\omega_2 - \omega_1 = \omega_{mmW}$ and $\varphi_2 - \varphi_1 = \varphi_{mmW}$; the optical millimeter wave signal $E_0$ is divided into two paths after passing through the optoisolator and the first optical coupler: one path is reflected by the first Faraday rotator mirror, and is input into the third optical coupler as the local reference light after passing through the first optical coupler; and the other path is divided into two parts after passing through the second optical coupler; after one part of the signal $E_0$ passes through the first optical filter and the first acousto-optic frequency shifter, an output signal is denoted as $E_1$, and after the other part of the signal $E_0$ passes through the second optical filter and the second acousto-optic frequency shifter, an output signal is denoted as $E_2$; and $E_1$ and $E_2$ signal expressions are as follows:

$$E_1 \propto \cos[(\omega_1 + \omega_{RF1})t + \varphi_1 + \varphi_{RF1}]$$

$$E_2 \propto \cos[(\omega_2 + \omega_{vco})t + \varphi_2 + \varphi_c]$$

in the formulas, $\omega_{RF1}$ and $\varphi_{RF1}$ are a frequency and an initial phase of radio frequency working of the first acousto-optic frequency shifter respectively, and $\omega_{vco}$ and $\varphi_c$ are a frequency and an initial phase of radio frequency working of the second acousto-optic frequency shifter, respectively; (ii) the $E_1$ and $E_2$ signals enter the transfer link after being combined by the fourth optical coupler, and after the combined signal passes through the third acousto-optic frequency shifter at the user terminal, an expression of an output signal $E_3$ is as follows:

$$E_3 \propto \cos[(\omega_1 + \omega_{RF1} + \omega_{RF2})t + \varphi_1 + \varphi_{RF1} + \varphi_{RF2} + \varphi_{p1}] +$$
$$\cos[(\omega_2 + \omega_{vco} + \omega_{RF2})t + \varphi_2 + \varphi_c + \varphi_{RF2} + \varphi_{p2}]$$

wherein in the formula, $\varphi_{p1}$ and $\varphi_{p2}$ represent phase noises introduced by the transfer link respectively, and $\omega_{RF2}$ and $\varphi_{RF2}$ represent a frequency and an initial phase of radio frequency working of the third acousto-optic frequency shifter respectively; the $E_3$ signal is divided into two parts after passing through the fifth optical coupler: one part is reflected by the second Faraday rotator mirror and then enters the transfer link, is transferred into the fourth optical coupler of the local terminal, then passes through paths reciprocal with the $E_1$ and $E_2$ signals in sequence, passes through the 3, 4 ports of the first optical coupler and is transferred to a the 1 port of the third optical coupler, wherein an expression of the signal is as follows:

$$E_4 \propto \cos[(\omega_1 + 2\omega_{RF1} + 2\omega_{RF2})t + \varphi_1 + 2\varphi_{RF1} + 2\varphi_{RF2} + 2\varphi_{p1}] +$$
$$\cos[(\omega_2 + 2\omega_{vco} + 2\omega_{RF2})t + \varphi_2 + 2\varphi_c + 2\varphi_{RF2} + 2\varphi_{p2}]$$

(iii) assuming that link noises transferred forward and backward are equal, and the $E_4$ signal and the local reference optical signal $E_0$ are divided into two paths after being combined by the third optical coupler: after one path passes through the third optical filter, the first photovoltaic conversion unit and the first electric filter in sequence, an output signal is denoted as $E_5$; and after the other path passes through the fourth optical filter, the second photovoltaic conversion unit and the second electric filter, an output signal is denoted as $E_6$, wherein expressions of $E_5$ and $E_6$ are as follows respectively:

$$E_5 \propto \cos[(2\omega_{RF1} + 2\omega_{RF2})t + 2\varphi_{RF1} + 2\varphi_{RF2} + 2\varphi_{p1}],$$

$$E_6 \propto \cos[(2\omega_{vco} + 2\omega_{RF2})t + 2\varphi_c + 2\varphi_{RF2} + 2\varphi_{p2}],$$

after sidebands of $E_5$ and $E_6$ signals are taken down through frequency mixing of the first mixer, an output direct-current error signal Ve enters the servo control unit, wherein an expression of the direct-current error signal is as follows:

$$Ve = 2\varphi_c - 2\varphi_{RF1} + 2\varphi_{p2} - 2\varphi_{p1},$$

when the servo control unit works in a locked state Ve·fwdarw·0, the expression may be further written as follows:

$$\varphi_c = \varphi_{RF1} - \varphi_{p2} \varphi_{p1},$$

(iv) at the user terminal, dividing the other part of the $E_3$ signal into two paths through the sixth optical coupler: after one path passes through the first optical phase locking unit, an output signal is denoted as $E_7$; and after the other path passes through a second optical phase locking unit, an output signal is denoted as Ea, wherein expressions of the $E_7$ and $E_8$ signals are as follows respectively:

$E_7 \propto \cos[(\omega_1+\omega_{RF1}+\omega_{RF2}-\omega_{RF3})t+\varphi_1+\varphi_{RF1}+\varphi_{RF2}+\varphi_{p1}-\varphi_{RF3}]$, $E_8 \propto \cos[(\omega_2+\omega_{vco}+\omega_{RF2}-\omega_{RF3})t+\varphi_2+\varphi_c+\varphi_{RF2}+\varphi_{p2}-\varphi_{RF3}]$, in the formulas, $\omega_{RF3}$ and $\varphi_{RF3}$ represent an angular frequency and an initial phase of a radio frequency signal output by the third microwave source respectively, and after the $E_7$ and $E_8$ signals are combined by the seventh optical coupler, after the combined signal is filtered by the third photovoltaic conversion unit and the third electric filter, an expression of an output signal is as follows:

$E_9 \propto \cos[(\omega_2-\omega_1)t+\varphi_2-\varphi_1+\varphi_c-\varphi_{RF1}+\varphi_{p2}-\varphi_{p1}]$, the expression of $\varphi_c$ is substituted into the above formula, and the expression of $E_9$ can be further rewritten as:

$E_9 \propto \cos[(\omega_2-\omega_1)t+\varphi_2-\varphi_1]$, (v) at any node of the transfer link, obtaining optical signals transferred forward and backward through the eighth optical coupler, and expressions of the optical signals are as follows:

$E_{10} \propto$
$\cos[(\omega_1+\omega_{RF1})t+\varphi_1+\varphi_{RF1}+\varphi_{pa1}]+\cos[(\omega_2+\omega_{vco})t+\varphi_2+\varphi_c+\varphi_{pa2}]$, $E_{11} \propto \cos[(\omega_1+\omega_{RF1}+2\omega_{RF2})t+\varphi_1+\varphi_{RF1}+2\varphi_{RF2}+\varphi_{p1}+\varphi_{pb1}]+$
$\cos[(\omega_2+\omega_{vco}+2\omega_{RF2})t+\varphi_2+\varphi_c+2\varphi_{RF2}+\varphi_{p2}+\varphi_{pb2}]$ in the formulas, $\varphi_{pa1}$ and $\varphi_{pa2}$ are phase noises, introduced by the transfer link, from the local terminal to the access terminal at $\omega_1$ and $\omega_2$ frequencies respectively, and $\varphi_{pb1}$ and $\varphi_{pb2}$ are phase noises, introduced by the transfer link, from the user terminal to the access terminal at the $\omega_1$ and $\omega_2$ frequencies, respectively; (vi) dividing the $E_{10}$ signal into three paths after passing through the ninth optical coupler, wherein one path is divided into two parts after being combined with the $E_{11}$ signal through the tenth optical coupler, an output signal is denoted as $E_{12}$ after one part passes through the fifth optical filter, the fourth photovoltaic conversion unit, the fourth electric filter and the first frequency divider unit, an output signal is denoted as $E_{13}$ after the other part passes through the sixth optical filter, the fifth photovoltaic conversion unit, the fifth electric filter and the second frequency divider, the $E_{12}$ and $E_{13}$ signals are loaded on the fourth acousto-optic frequency shifter and the fifth acousto-optic frequency shifter respectively, and expressions of the $E_{12}$ and $E_{13}$ signals are as follows:

$E_{12} \propto \cos\left(\omega_{RF2}t+\varphi_{RF2}+\frac{\varphi_{p1}+\varphi_{pb1}-\varphi_{pa1}}{2}\right)$ $E_{13} \propto \cos\left(\omega_{RF2}t+\varphi_{RF2}+\frac{\varphi_{p2}+\varphi_{pb2}-\varphi_{pa2}}{2}\right)$ (vii) the other two paths of the $E_{10}$ signal passes through the seventh optical filter and the fourth acousto-optic frequency shifter as well as the eighth optical filter and the fifth acousto-optic frequency shifter respectively, and after the two paths of signals are combined by the eleventh optical coupler, an expression of the combined signal is as follows:

$E_{14} \propto$
$\cos\left[(\omega_1+\omega_{RF1}+\omega_{RF2})t+\varphi_1+\varphi_{RF1}+\varphi_{pa1}+\varphi_{RF2}+\frac{\varphi_{p1}+\varphi_{pb1}-\varphi_{pa1}}{2}\right]+$
$\cos\left[(\omega_2+\omega_{vco}+\omega_{RF2})t+\varphi_2+\varphi_c+\varphi_{pa2}+\varphi_{RF2}+\frac{\varphi_{p2}+\varphi_{pb2}-\varphi_{pa2}}{2}\right]$ in the formula, a phase noise introduced by the link has a following relationship: $\varphi_{pb1}+\varphi_{pa1}=\varphi_{p1}$, $\varphi_{pb2}+\varphi_{pa2}=\varphi_{p2}$, and the $E_{14}$ signal may be further rewritten as follows:

$E_{14} \propto \cos[(\omega_1+\omega_{RF1}+\omega_{RF2})t+\varphi_1+\varphi_{RF1}+\varphi_{p1}+\varphi_{RF2}]+$
$\cos[(\omega_2+\omega_{vco}+\omega_{RF2})t+\varphi_2+\varphi_c+\varphi_{p2}+\varphi_{RF2}]$ after a phase locked loop enters a locked state, the $E_{14}$ passes through the sixth photovoltaic conversion unit and the sixth electric filter, and an expression of an output signal is as follows:

$E_{15} \propto \cos[(\omega_2-\omega_1)t+\varphi_2-\varphi_1]$ the user terminal and any access terminal may both obtain a stable millimeter wave terahertz signal.

4. The optical millimeter wave terahertz transfer system according to claim 1, wherein the transfer link is an optical fiber link or a free space link, and the free space link is composed of a free space optical transmitter module, a receiving module and free space links.

5. A millimeter wave terahertz transfer method using the optical millimeter wave terahertz transfer system of claim 1, comprising: S1, a to-be-transferred optical millimeter wave signal of the local terminal is $E_0 \propto \cos(\omega_1 t+\varphi_1)+\cos(\omega_2 t+\varphi_2)$, wherein a difference between two angular frequencies and a difference between two phases are matched with a frequency and a phase of a millimeter wave respectively, that is $\omega_2-\omega_1=\omega_{mmW}$ and $\varphi_2-\varphi_1=\varphi_{mmW}$; the optical millimeter wave signal $E_0$ is divided into two paths after passing through the optoisolator and the first optical coupler: one part of the to-be-transferred optical millimeter wave signal $E_0$ is reflected by the first Faraday rotator mirror, returned to the first optical coupler, and is input into the third optical coupler as the local reference light after passing through the first optical coupler; and the other part of the to-be-transferred optical millimeter wave signal $E_0$ is divided into two paths after passing through the second optical coupler; after one path passes through the first optical filter and the first acousto-optic frequency shifter, an output signal is denoted as $E_1$; after the other path passes through the second optical filter and the second acousto-optic frequency shifter, an output signal is denoted as $E_2$; and $E_1$ and $E_2$ signal expressions are as follows:

$E_1 \propto \cos[(\omega_1+\omega_{RF1})t+\varphi_1+\varphi_{RF1}]$ $E_2 \propto \cos[(\omega_2+\omega_{vco})t+\mu_2+\varphi_c]$ in the formulas, $\omega_{RF1}$ and $\varphi_{RF1}$ are a frequency and an initial phase of radio frequency working of the first acousto-optic frequency shifter respectively, and $\omega_{vco}$ and $\varphi_c$ are a frequency and an initial phase of radio frequency working of the second acousto-optic frequency shifter respectively; $\omega_{RF1}=\omega_c$; S2, the $E_1$ and $E_2$ signals reach the user terminal through the transfer link after being combined by the fourth optical coupler, and after the combined signal passes through the third acousto-optic frequency shifter, an expression of an output signal $E_3$ is as follows:

$$E_3 \propto \cos[(\omega_1 + \omega_{RF1} + \omega_{RF2})t + \varphi_1 + \varphi_{RF1} + \varphi_{RF2} + \varphi_{p1}] +$$
$$\cos[(\omega_2 + \omega_{vco} + \omega_{RF2})t + \varphi_2 + \varphi_c + \varphi_{RF2} + \varphi_{p2}]$$

wherein in the formula, $\varphi_{p1}$ and $\varphi_{p2}$ represent phase noises introduced by the transfer link respectively, and $\omega_{RF2}$ and $\varphi_{RF2}$ represent a frequency and an initial phase of radio frequency working of the third acousto-optic frequency shifter, respectively; the $E_3$ signal is divided into two parts after passing through the fifth optical coupler: one part of the signal $E_3$ is reflected by the second Faraday rotator mirror and then transferred into the fourth optical coupler of the local terminal through the transfer link, then passes through paths reciprocal with the $E_1$ and $E_2$ signals in sequence, passes through the 3, 4 ports of the first optical coupler and is transferred to a the 1 port of the third optical coupler, wherein an expression of the signal is as follows:

$$E_4 \propto \cos[(\omega_1 + 2\omega_{RF1} + 2\omega_{RF2})t + \varphi_1 + 2\varphi_{RF1} + 2\varphi_{RF2} + 2\varphi_{p1}] +$$
$$\cos[(\omega_2 + 2\omega_{vco} + 2\omega_{RF2})t + \varphi_2 + 2\varphi_c + 2\varphi_{RF2} + 2\varphi_{p2}]$$

S3, assuming that link noises transferred forward and backward are equal, and the $E_4$ signal and the local reference optical signal $E_0$ are divided into two paths after being combined by the third optical coupler: after one path passes through the third optical filter, the first photovoltaic conversion unit and the first electric filter in sequence, an output signal is denoted as $E_5$; after the other path passes through the fourth optical filter, the second photovoltaic conversion unit and the second electric filter, an output signal is denoted as $E_6$, wherein expressions are as follows respectively:

$$E_5 \propto \cos[(2\omega_{RF1}+2\omega_{RF2})t+2\varphi_{RF1}+2\varphi_{RF2}+2\varphi_{p1}],$$

$$E_6 \propto \cos[(2\omega_{vco}+2\omega_{RF2})t+2\varphi_c+2\varphi_{RF2}+2\varphi_{p2}],$$

after sidebands of $E_5$ and $E_6$ signals are taken down through frequency mixing of the first mixer, an output direct-current error signal Ve enters the servo control unit, wherein an expression of the direct-current error signal is as follows:

$$Ve=2\varphi_c-2\varphi_{RF1}+2\varphi_{p2}-2\varphi_{p1},$$

when the servo control unit works in a locked state Ve·fwdarw·0, then:

$$\varphi_c=\varphi_{RF1}-\varphi_{p2}\varphi_{p1},$$

S4, dividing the other part of the $E_3$ signal into two paths through the sixth optical coupler: after one path passes through the first optical phase locking unit, an output signal is denoted as $E_7$; and after the other path passes through a second optical phase locking unit, an output signal is denoted as $E_8$, wherein expressions are as follows, respectively:

$$E_7 \propto \cos[(\omega_1+\omega_{RF1}+\omega_{RF2}-\omega_{RF3})t+\varphi_1+\varphi_{RF1}+\varphi_{RF2}+\varphi_{p1}-\varphi_{RF3}],$$

$$E_8 \propto \cos[(\omega_2+\omega_{vco}+\omega_{RF2}-\omega_{RF3})t+\varphi_2+\varphi_c+\varphi_{RF2}+\varphi_{p2}-\varphi_{RF3}],$$

in the formulas, $\omega_{RF3}$ and $\varphi_{RF3}$ represent an angular frequency and an initial phase of a radio frequency signal output by the third microwave source respectively, and after the $E_7$ and $E_8$ signals are combined by the seventh optical coupler, after the combined signal is filtered by the third photovoltaic conversion unit and the third electric filter, an expression of an output signal $E_9$ is as follows:

$$E_9 \propto \cos[(\omega_2-\omega_1)t+\varphi_2-\varphi_1+\varphi_c-\varphi_{RF1}+\varphi_{p2}-\varphi_{p1}],$$

the expression of $\varphi_c$ is substituted into the above formula, and the expression of $E_9$ is:

$$E_9 \propto \cos[(\omega_2-\omega_1)t+\varphi_2-\varphi_1].$$

* * * * *